US008207081B1

(12) United States Patent
Huang et al.

(10) Patent No.: US 8,207,081 B1
(45) Date of Patent: Jun. 26, 2012

(54) NANOCOMPOSITE FOR PHOTOCATALYTIC HYDROGEN PRODUCTION AND METHOD FOR ITS PREPARATION

(75) Inventors: Cunping Huang, Cocoa, FL (US); Weifeng Yao, Shanghai (CN); Nazim Muradov, Melbourne, FL (US); Ali Raissi, Melbourne, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 42 days.

(21) Appl. No.: 12/715,759

(22) Filed: Mar. 2, 2010

Related U.S. Application Data

(63) Continuation-in-part of application No. 12/267,569, filed on Nov. 8, 2008.

(60) Provisional application No. 61/156,719, filed on Mar. 2, 2009.

(51) Int. Cl.
*B01J 27/047* (2006.01)
*B01J 27/043* (2006.01)
*B01J 27/045* (2006.01)
*B01J 23/00* (2006.01)

(52) U.S. Cl. ........ 502/219; 502/222; 502/223; 502/313; 502/319

(58) Field of Classification Search .................. 502/219, 502/222, 223, 313, 319
See application file for complete search history.

(56) References Cited

U.S. PATENT DOCUMENTS 7,217,678 B2 * 5/2007 Rao et al. ....................... 502/224
7,332,146 B1 2/2008 Huang

OTHER PUBLICATIONS

"Noble-Metal/Cr2O3 Core/Shell Nanoparticles as a Cocatalyst for Photocatalytic Overall Water Splitting," Kazuhiko Maeda et al. Angew. Chem. Intl. Ed. (2006), 45, pp. 7806-7809.*
"A novel Pd-Cr2O3/CdS photocatalyst for solar hydrogen production using a regenerable sacrificial donor," Weifeng Yao et al. International Journal of Hydrogen Energy 36 (2011), pp. 4710-4715.*
Hui, K.S., Chao, C.Y. H., Lu, S.C., Removal of the Mixed Heavy Metal Ions in a wastewater by Zeolite 4A and Residual Products for Recycled Coal Fly Ash, Journal of Hazardous Materials, 2005, pp. 89-101, vol. 127, No. 1-3.
Alvarez-Ayuso, E., Garcia-Sanchez, A., Querol, X., Purification of Metal Electroplating Waste Waters Using Zeolites, Water Research, 2003, pp. 4855-4862, vol. 37, No. 20.
Heitz, C., Binana-Limbele, W., Francois, J., Biver, C., Absorption and Desorption of Chromium Lons by Poly (acrylic acid) Gels, Journal of Applied Polymer Science, 1999, pp. 455-466, vol. 72, No. 4.
Wu, D., Sui, Y., He, S., Wang, X., Li, C., Kong, H., Removal of Trivalent Chromium from Aqueous Solution by Zeo, lite Synthesized from Coal Fly Ash, Journal of Hazardous Materials, 2008, pp. 415-423, vol. 155, No. 1-2.
Wang, Y., Liu, H., Jiang, Y., A New Method for Immobilization of Polymer-Positive Colloidal Platinum Metals via Co-Ordination Capture with Anchored Ligands. Synthesis of the first example of a Mercapto-Containing Supported Metallic Catalyst for Hydrogenation of Alkenes with High Activity. Journal of the Chemical Society, Chemical Communications, 1989, pp. 1878-1879, Abstract.
Creighton, J. A., Eadon, D. G., Ultraviolet-Visible Absorption Spectra of the Colloidal Metallic Elements, Journal of Chemical Society, Faraday Trasactions, 1991, pp. 3881-3891, vol. 87, Abstract.
Wang, Y. Liu, H., Huang, Y., Immobilization of Polymer-Protected Metal Colloid Catalysts by the Formations of Polymer Hydrogen Bond Complexes, Polymers for Advanced Technologies, 1996, pp. 634-638, vol. 7, No. 8.
Wang, Q., Liu, H., Wang, H., Immobilization of Polymer-Stabilized Nobel Metal Colloids and Their Catalytic Properties of Hydrogenation of Olefins, Journal of colloid and Interface Science, 1997, pp. 380-386, vol. 190, No. 2.
Esumi, K., Takamine, K., Ono, M., Osada, T., Ichikawa, S., The Interaction of Poly (Vinylpyrrolidone) and Solid Particles in Ethanol, Journal of Colloid and Interface Science, 1993, pp. 321-324, vol. 161, No. 2.
Hamdaoui, A,. E., Bergeret, G., Massardier, J., Primet, M., Renouprez, A., CO and NO Interaction with Pd-Ag and Pd-Cr Bimetallic Catalysts, Journal of Catalysis, 1994, pp. 47-55, No. 1.
Teranishi, T., Miyake, M., Size Control of Palladium Nanoparticles and Their Crystal Structures, Chemistry of Materials, 1998, pp. 594-600, vol. 10 No. 2, Abstract.
Jaramillo, T. F., Jorgensen, P. K., Bonde, J., Horch, S. N., Chorkendorff, I., Science, 2007, pp. 100-102,vol. 317, No. 5834.
Hinnemann, B., Moses, G. P., Bonde, J., Jorgenson, P. K., Neilsen, H. J., Horch, S., Chorkendorff, I., Norskov, K. J., Biomimetic Hydrogen Evolution: MoS2 Nanoparticles as Catalyst for Hydrogen Evolution, Journal of the American Chemical Society, 2005, pp. 5308-5309, vol. 127, No. 15.
Zong, X., Yan, H., Wu, G., Ma, G., Wen, F., Wang, L., Li, C., Enhancement of Photocatalytic H2 Evolution on CdS by Loading MoS2 as Cocatalyst under Visible Light Irradiation, Journal of the American Chemical Society, 2008, pp. 7176-7177, vol. 130, No. 23.
Dickinson, A., James, D., Perkins, N., Cassidy, T., Bowker, M., The Photocatalytic Reforming of Methoanol, Journal of Molecular Catalysis A: Chemical,1999, pp. 211-221, vol. 146, No. 1-2.
Ikarashi, I., Kobayashi, H. S., Nishiyama, H., Inoue, Y., Journal of Physic Chemistry, 2002, pp. 9048-9053, vol. 106.
Kato, H., Asakura, K.,. Kudo, A., Highly Efficient Water Splitting into H2 and O2 over Lanthanum-Doper NaTaO3 Photocatalysts with High Crystallinity and Surface Nanostructure, Journal of the American Chemical Society, 2003, pp. 3082-3089, vol. 125, No. 10.
Maeda, K., Teramura, K., Lu, D.Takata, T., Saito, N., Inoue, Y., Domen, K., Photocatalyst Releasing Hydrogen From Water, Nature, 2006, pp. 295, vol. 440.

* cited by examiner

*Primary Examiner* — Patricia L Hailey
(74) *Attorney, Agent, or Firm* — Brian S. Steinberger; Phyllis K. Wood; Law Offices of Brian S. Steinberger, P.A.

(57) ABSTRACT

A novel M—Pd—$Cr_2O_3$ (M=Pt, Ru, Rh, Os, Au and Ag) nanocomposite cocatalysts and its preparation method. The cocatalysts loaded on CdS photocatalyst enhances the photocatalytic activities toward $H_2$ evolution from aqueous solutions $(NH_4)_2SO_3$, a regenerable electron donor, under sunlight radiation. An embodiment provides a new and facile method and system for the preparation of M—Pd—$Cr_2O_3$ nanocomposite cocatalysts at room temperature. Pd—$Cr_2O_3$ loaded CdS photocatalyst has higher hydrogen evolution activity than that of a plain Pd metal loaded CdS and its performance is comparable to that of Pt/CdS photocatalyst. Formation of a Pd—$Cr_2O_3$ composite with reduced size of nanoparticles results in an increase in the photocatalyst activity for $H_2$ evolution.

12 Claims, 10 Drawing Sheets

NANOCOMPOSITE FOR PHOTOCATALYTIC HYDROGEN PRODUCTION AND METHOD FOR ITS PREPARATION

This application is a continuation-in-part of U.S. application Ser. No. 12/267,569 filed on Nov. 8, 2008 which claimed the benefit of priority to U.S. Provisional Application No. 60/986,820 filed on Nov. 9, 2007 and was funded in part by the National Aeronautics and Space Administration (NASA)—Glenn Research Center under contract number NAG3-2751, and claims the benefit of priority to U.S. Provisional Application No. 61/156,719 filed on Mar. 2, 2009.

FIELD OF THE INVENTION

This invention relates to hydrogen production and, in particular, to systems and methods for preparation of a Pd—$Cr_2O_3$ loaded CdS co-catalyst as a cocatalyst for solar photocatalytic hydrogen evolution on CdS.

BACKGROUND AND PRIOR ART

Photocatalytic water splitting has been studied extensively for converting solar energy into clean hydrogen fuel ($H_2$). The development of photocatalysts that can be excited by photons having sufficiently long wavelengths (e.g., greater than 400 nm) is a prerequisite to efficient solar energy conversion and storage. The solar energy conversion efficiencies of the photocatalysts developed to date for direct water splitting has been low, typically, less than 3% under visible light irradiation. However, indirect photocatalytic splitting of water is also possible using sacrificial electron donors. This method of water splitting is viable only if a closed-loop scheme (i.e. a chemical cycle) can be envisaged that allows continuous regeneration of the sacrificial agent.

Florida Solar Energy Center, a research institute of the University of the Central Florida, has proposed a class of efficient, solar driven thermochemical water splitting cycles, in which solar photonic energy is used for the production of hydrogen from an aqueous ammonium sulfite solution, while solar thermal energy is employed to produce oxygen. This unique approach of utilizing the total solar radiation spectrum may enhance the efficiency of solar to hydrogen energy conversion. Previously, a new class of solar hybrid thermo-photochemical water splitting cycles that utilize ammonium sulfite as a regenerable reagent for the production of hydrogen from water was described. One version of the cycle that incorporates a sub-cycle based on the transition metal oxides for the oxygen evolution is given below:

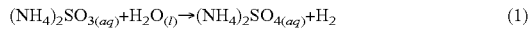

$(NH_4)_2SO_{3(aq)} + H_2O_{(l)} \rightarrow (NH_4)_2SO_{4(aq)} + H_2$     (1)

(Photocatalytic, 25° C.)

$(NH_4)_2SO_{4(s)} + MO_{(s)} \rightarrow 2NH_{3(g)} + MSO_{4(s)} + H_2O_{(g)}$     (2)

(Thermolytic, 500° C.)

$MSO_{4(s)} \rightarrow SO_{2(g)} + MO_{(s)} + \tfrac{1}{2}O_2$     (3)

(Thermolytic, 900° C.)

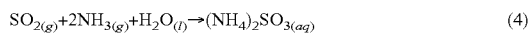

$SO_{2(g)} + 2NH_{3(g)} + H_2O_{(l)} \rightarrow (NH_4)_2SO_{3(aq)}$     (4)

(Chemical absorption, 25° C.)

where M=Zn, Fe, Mg, etc. $(NH_4)_2SO_3$ is the electron donor reagent in the photocatalytic reaction (1). The ammonium sulfate, $(NH_4)_2SO_4$, forms as a main product of the reaction (1) that is converted to $SO_2$, ammonia and water via thermolytic reactions (2) and (3). Ammonium sulfite is regenerated by the absorptive reaction of $SO_2$, $NH_3$ and water, reaction step (4).

In a closed water splitting cycle, the overall energy conversion efficiency depends on the efficiencies of both the $H_2$ and $O_2$ production steps. The thermolytic processes represented by reactions (3) and (4) are fairly efficient due to the high reaction temperatures involved. Therefore, the energy conversion efficiency of the photocatalytic $H_2$ production step represented by the reaction (1) dictates the overall cycle efficiency for converting solar energy to that stored as chemical energy in hydrogen.

Although visible-light induced photocatalytic activity of CdS for $H_2$ production from aqueous solutions of alkali metal sulfites and sulfides has been known since the early 1980s, in most cases, Pt (alone or in combination with other metals) was used as a cocatalyst with the aim of enhancing the $H_2$ evolution rate. Recently, a number of composite cocatalysts with metal/oxide (core/shell) structure, such as Ni/NiO and Rh/$Cr_2O_3$, have been shown to impart higher catalytic activity than that of only metal or metal oxide cocatalysts.

Methods for the preparation of cocatalysts fall into two broad areas, namely: impregnation and photodeposition. In the former impregnation method, a high temperature activation process (300-500° C.) is often needed. The latter photodeposition technique has been primarily used for the deposition of noble metal particles. Neither of these two methods is particularly useful in preparing composite cocatalysts containing a metal oxide.

The method and system of the present invention provides a new Pd—$Cr_2O_3$ nanocomposite cocatalyst and a facile method for its preparation at room temperature. Unlike the impregnation and photodeposition methods, cocatalyst activation is not required Experimental results showed that the as-prepared cocatalyst shows high efficiency toward $H_2$ evolution that is comparable to that obtained using much more expensive Pt based cocatalysts.

SUMMARY OF THE INVENTION

A primary objective of the invention is to provide a reproducible method and system for the development of Pd—$Cr_2O_3$ nanocomposite co-catalyst. The Pd—$Cr_2O_3$ loaded on CdS main photocatalyst shows a higher photocatalytic activity than that of a plain Pd metal loaded catalyst.

A secondary objective of the invention is to provide a reproducible method and system for the preparation of a co-catalyst with reduction in the particle size.

A third objective of the invention is to provide methods and systems for the formation of a composite co-catalyst Pd—$Cr_2O_3$ for the increase in the hydrogen evolution rate.

A fourth objective of the present invention provides a Pd—$Cr_2O_3$ based nanocomposite as a co-catalyst that can be used to replace a more expensive Pt based co-catalyst for the photochemical production of hydrogen from a regenerable ammonium sulfite regent.

A fifth objective of the present invention provides a method and system to use a polymer stabilization effect for the synthesis of cocatalyst nanoparticles. Furthermore, the technology of the present invention (the modified $NaBH_4$ reduction method) does not require a catalyst pre-treatment process as do conventional thermal deposition methods. A first embodiment provides a method and system for preparation of Pd—$Cr_2O_3$ nanocomposite particles that includes the steps of mixing $H_2PdCl_4$ and $Cr(NO_3)_3$ as a precursor solution, reducing the palladium chloride with aqueous $NaBH_4$ to form Pd colloidal solution, adding cadmium sulfide (CdS) powder to the Pd colloidal solution with vigorous stirring to disperse the powder and adding $(NH_4)_2SO_3$ solution to as prepared solution to form Pd—$Cr_2O_3$·$nH_2O$ particles that are loaded on CdS surface forming Pd—$Cr_2O_3$/CdS photocatalyst. The method clan also include adding and mixing polyvinylpyrolidone (PVP) to the $H_2PdCl_4$ and $Cr(NO_3)_3$ solution prior to the reducing step to prevent the agglomeration of Pd nanoparticles formed during the reduction step.

The reacting step can include the step of co-loading Pd and $Cr_2O_3$ onto the surface of CdS photocatalyst to increase the $H_2$ evolution rate and the adding CdS step can include the step of adding of chromium oxide in a range of on 0.05 wt % to approximately 0.1 wt % to improve the photocatalytic oxidation of aqueous ammonium sulfite for hydrogen evolution. In a preferred embodiment, the CdS content to approximately 0.5 g. Also the amount of Pd can be increased to approximately 0.4 wt % and/or Pt can be added to the Pd—$Cr_2O_3$/CdS photocatalyst to form a Pt—Pd—$Cr_2O_3$/CdS composite photocatalyst or at least one noble metal selected from a group consisting of Ru, Rh, Os, Au and Ag can be added to the Pd—$Cr_2O_3$ cocatalyst to form metal-Pd—$Cr_2O_3$ nanocomposite cocatalysts to improve the solar hydrogen evolution rates.

Another facile method for production of Pd metal colloid particles includes mixing $H_2PdCl_4$ and $Cr(NO_3)_3$ solution as a precursor, adding PVP to the precursor solution, mixing thoroughly and reducing the precursor solution with aqueous $NaBH_4$ solution to form a Pd colloidal solution. Cadium sulfide (CdS) powder can be added to the resulting solution while stirring to disperse CdS powder. In this method, the reducing step can include adding 1.0 M $(NH_4)_2SO_3$ solution to as prepared solution to form Pd—$Cr_2O_3 \cdot nH_2O$ particles that are loaded on CdS surface forming Pd—$Cr_2O_3$/CdS photocatalyst. An alternative method to prepare a $Cr_2O_3$ modified Pd metal colloid as a cocatalyst to produce hydrogen from aqueous ammonium sulfite solutions as electron donors include providing solutions of $H_2PdCl_4$ and $Cr(NO_3)_3$, adding PVP to the mixture of $H_2PdCl_4$ and $Cr(NO_3)_3$ to prevent aggregation of Pd nanoparticles, reducing the solution of $H_2PdCl_4$ and $Cr(NO_3)_3$ with $NaBH_4$ solution to produce nanosized Pd colloidal solution, adding CdS powder to the Pd colloidal solution while stirring vigorously and adding the resulting solution to an aqueous solution of $(NH_4)_2SO_3$ to produce Pd—$Cr_2O_3$/CdS photocatalyst for hydrogen production from $(NH_4)_2SO_3$ photolyte.

Yet another method and system for preparing a catalyst for hydrogen production includes the steps of providing palladium chloride ($PdCl_2$) as a precursor, reducing the precursor with sodium borohydride ($NaBH_4$) for the preparation of nanosized palladium metal colloid and adding aqueous $Cr(NH_3)_3$ solution into the Pd colloid, adding CdS semiconductor powder to the mixture of Pd colloid and $Cr(NH_3)_3$ solution, adding aqueous $(NH_4)_2SO_3$ solution to as prepared solution to form Pd—$Cr_2O_3 \cdot nH_2O$ particles that are loaded on CdS surface forming Pd—$Cr_2O_3$/CdS photocatalyst and immobilize Pd—$Cr_2O_3$ nanoparticles onto the surface of CdS main photocatalyst forming co-catalyst loaded CdS photocatalyst, wherein the activity of Pd/CdS is significantly enhanced by addition of $Cr_2O_3$ nanocomposites.

A second embodiment provides a nano composite cocatalyst for solar hydrogen production that is Pd—$Cr_2O_3$ loaded CdS co-catalyst for solar hydrogen production. At least one noble metal selected from a group consisting of Pt, Ru, Rh, Os, Au and Ag can be added to the Pd—$Cr_2O_3$ cocatalyst to form metal-Pd—$Cr_2O_3$ nanocomposite cocatalysts.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

U.S. Pat. No. 7,332,146 which teaches subject matter related to the present invention was issued on Feb. 19, 2008 to the same assignee as the subject application and having a common inventor with the subject application, is incorporated herein by reference. This application is a continuation-in-part of U.S. patent application Ser. No. 12/267,569 filed on Nov. 8, 2008 and is related to the subject matter of U.S. patent application Ser. No. 11/732,497 filed on Apr. 4, 2006 assigned to the same assignee as the subject application and having a common inventor with the subject application, which is incorporated by reference.

The method and system of the present invention provides a new Pd—$Cr_2O_3$ nanocomposite cocatalyst and a facile method for its preparation at room temperature. Unlike the impregnation and photodeposition methods, cocatalyst activation is not required. The as-prepared cocatalyst of the present invention shows high efficiency toward $H_2$ evolution that is comparable to that obtained using much more expensive Pt based cocatalysts.

The $Cr_2O_3$ modified Pd metal colloid particles were prepared by a modified $NaBH_4$ reduction method. In detail, a 15 ml aqueous solution containing $1.25 \times 10^{-3}$ M $H_2PdCl_4$ and $0.64 \times 10^{-3}$ M $Cr(NO_3)_3$ was reacted with an appropriate amount of aqueous $NaBH_4$ solution. Although hydrous chromium oxide (or chromic hydroxide) species with the general formula of $Cr_2O_3 \cdot nH_2O$ are formed during this reaction (see further discussion), for simplicity, hereafter, it will be refer as $Cr_2O_3$. In order to prevent agglomeration of nanoparticles formed during the reduction of $H_2PdCl_4$ in the presence of $Cr(NO_3)_3$ solution, a small amount of polyvinylpyrolidone (PVP) was added to the solution and mixed thoroughly. This was followed by addition of 0.5 g of cadmium sulfide (CdS) powder to the solution while stirring it vigorously, forming $Pd$—$Cr_2O_3$ cocatalyst loaded CdS photocatalyst, (Pd—$Cr_2O_3$)/CdS. The photocatalyst was then mixed with 285 ml of 1.0 M aqueous $(NH_4)_2SO_3$ solution that was used as the photolyte for photocatalytic hydrogen production. During the reaction, the change in pH of the photolyte was less than 0.1.

Figure 1:
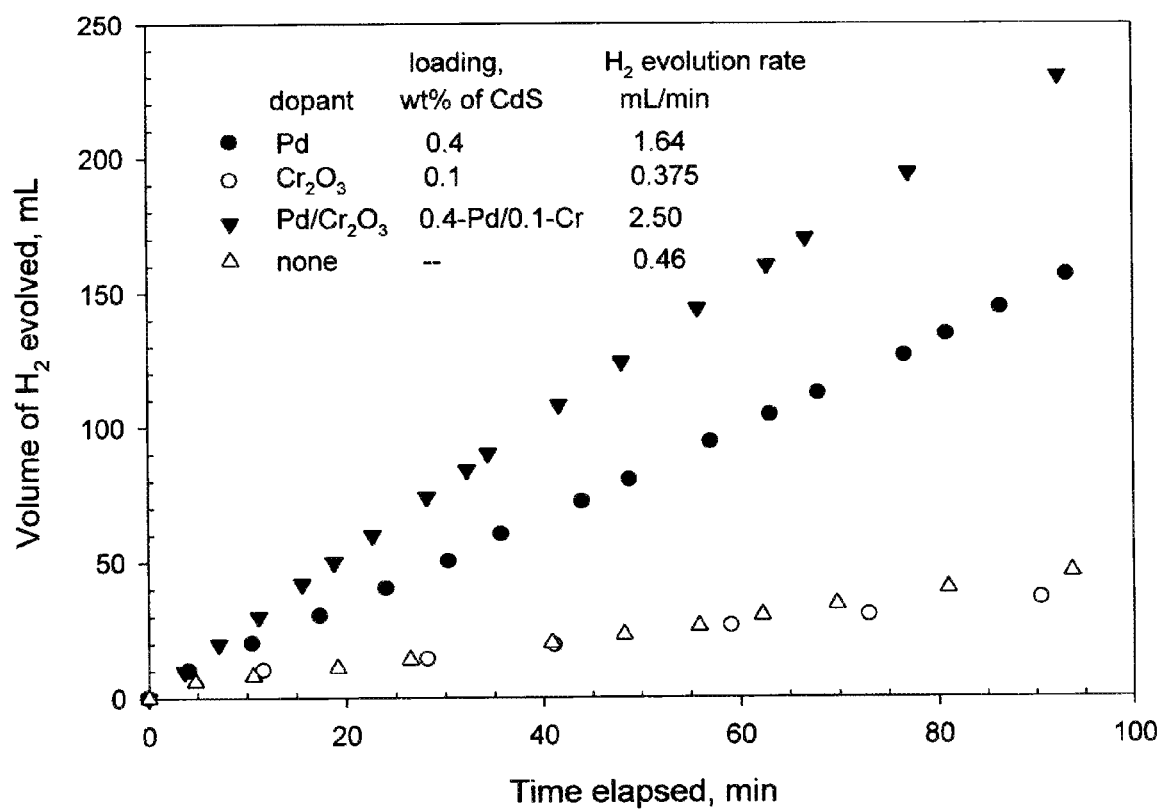
FIG. 1 is a graph showing the effect of photocatalyst loading of 1.67 g CdS loaded with Pd and/or $Cr_2O_3$ per liter of photolyte and rate of $H_2$ evolution from an aqueous 1.0 M ammonium sulfite solution.

FIG. 1 is a graph showing the effect of Pd—$Cr_2O_3$ loading on the rate of $H_2$ evolution from an aqueous 1.0 M ammonium sulfite solution. Note that the photocatalytic activity of pure CdS for hydrogen evolution was low—i.e. 0.46 ml/min. Furthermore, the CdS loaded with 0.1 wt % $Cr_2O_3$ showed negligible activity for $H_2$ production (0.38 ml/min). When 0.4 wt % Pd was loaded on CdS, the $H_2$ evolution rate increased to 1.64 ml/min. Interestingly, when CdS was co-loaded with 0.4 wt. % Pd and 0.05 wt. % chromium oxide as (Pd—$Cr_2O_3$)/CdS, the hydrogen evolution rate increased significantly (2.29 ml/min) corresponding to a photon energy conversion efficiency (P. E.) of about 18.3%. The efficiencies in this application were calculated using the spectrum ranging from 300 to 520 nm, which is different from that calculated based on the single light irradiation (420 nm). The efficiency defined in this manner is based on the practical application and can be used for solar energy conversion calculation directly.

Experimental results showed that increasing the $Cr_2O_3$ content to 0.1 wt % further enhanced the $H_2$ evolution rate to 2.50 ml/min. This result indicates that by adding even small amounts of $Cr_2O_3$ to the Pd particles, the P.E. for the photocatalytic oxidation of aqueous ammonium sulfite increases significantly. The optimum amount of chromium oxide loading appears to be about 0.1 wt % yielding a P.E. value of 20.0%. Increasing the chromium loading beyond 0.1 wt % resulted in a slight decrease in the P.E. values that in all likelihood was caused by a partial light blocking effect of $Cr_2O_3$ particles.

Figure 2:
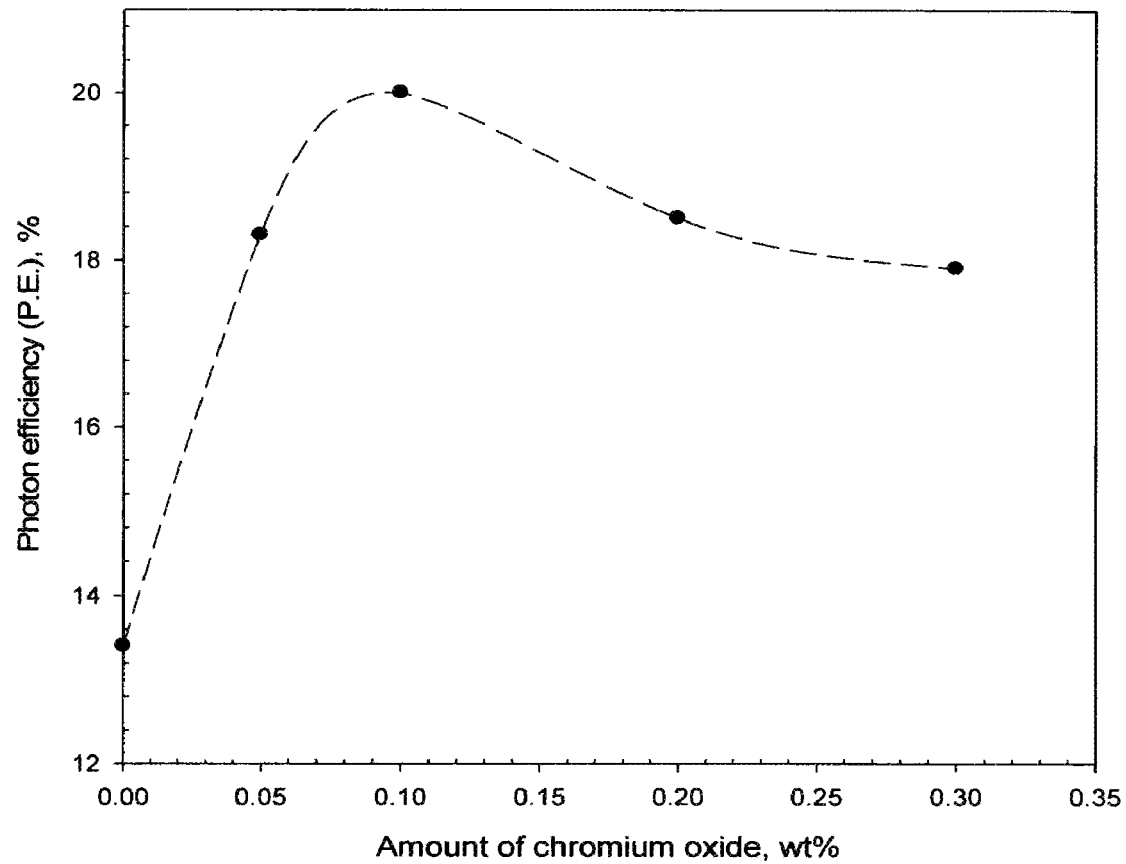
FIG. 2 is a graph showing the effect of chromium oxide doping on the activity of Pd—$Cr_2O_3$/CdS photocatalyst performance.

It is known that noble metals (e.g. Pt, Pd, Ru, Rh, Ag, and Au) and some transition-metal oxides like NiO promote $H_2$ evolution from aqueous solutions of electron donors. Among noble metal promoters, Pt is known to be the most efficient. To determine the relative activity of Pd—$Cr_2O_3$/CdS in comparison with Pt/CdS, cadmium sulfide particles were loaded with 0.5 wt % of Pt. The activity of Pt/CdS photocatalyst was measured under the same experimental conditions as those for the Pd—$Cr_2O_3$/CdS photocatalyst. The results showed that CdS loaded with Pd—$Cr_2O_3$ co-catalyst performed on a par with the Pt loaded CdS as shown in FIG. 2.

The experimental activities of the co-inventors leading to the novel co-catalyst and the preparation technique are discussed in the following paragraphs.

The materials and instruments used by the co-inventors during the experimental process included palladium chloride ($PdCl_2$, 99.99% purity), chromium nitrate ($Cr(NO_3)_3 \cdot 9H_2O$, 98% purity) and ammonia sulfite (($NH_4)_2SO_3 \cdot H_2O$, 92% purity) were obtained from Sigma-Aldrich. Cadmium sulfide (CdS, 99.99% purity) was provided by Alfa Aesar. Sodium borohydride ($NaBH_4$, 98%) and polyvinylpyrolidone (PVP, K30, $[MW]_{avg}$=40,000) were acquired from Acros Organics and Fluka, respectively. All chemicals were used as received without further purification. High resolution transmission electron microscopy (HRTEM) analyses of the catalysts were conducted on a Philips EM 420 transmission electron microscope operated at 300 kV. UV-visible absorption spectra were recorded on a Shimadzu UV-2401 PC UV—Vis Recording Spectrophotometer.

Experimentally, in a typical synthesis, a $Cr_2O_3$ modified Pd metal colloid was prepared by reducing a 15 ml aqueous solution of $1.25 \times 10^{-3}$ M $H_2PdCl_4$ and $0.64 \times 10^{-3}$ M $Cr(NO_3)_3$ with a few drops of $NaBH_4$ solution. Prior to the reduction a small amount of PVP was added to the mixture of $H_2PdCl_4$ and $Cr(NO_3)_3$ solution to prevent aggregation of Pd nanoparticles. The resulting solution contained nanosized Pd particles mixed with hydrous chromium oxide or chromic hydroxide ($Cr_2O_3 \cdot nH_2O$). Approximately 0.5 g of CdS powder was added to the dark-brown Pd colloidal solution while stirring vigorously. This solution was then added to a 285 ml aqueous solution of 1.0 M $(NH_4)_2SO_3$ (total volume: 300 ml) and used as photolyte for hydrogen production. For the sake of comparison, a second batch of photolyte containing Pt-loaded CdS, (0.5 wt % Pt) photocatalyst was also prepared by similar method, using $H_2PtCl_6$ as a precursor solution.

Photocatalytic reactions were carried out in a photoreactor fitted with a quartz window (15 cm in diameter). 0.5 g of CdS powder, loaded with co-catalysts, was dispersed in approximately 300 ml aqueous solution of 1.0 M $(NH_4)_2SO_3$. A peristaltic pump was used to circulate the photolyte between a three-neck flask and the photoreactor. No stirring was used inside the photoreactor. A 1000 W diversion beam solar simulator (Newport/Oriel Corp.) equipped with an air mass (AM) 1.5 global filter served as the radiation source. Prior to the photocatalytic reaction, the $(NH_4)_2SO_3$ solution was purged with argon gas for one hour to remove all dissolved oxygen gas. The $H_2$ gas produced in the photoreactor was collected in a graduated cylinder by a water displacement method. In order to calculate photon efficiency of the process co-inventors used a calibrated OSM photo-spectrometer (OMS-100-UV/VIS, Newport/Oriel Corp.) equipped with a Sony CCD sensor for measuring the irradiance.

As to the efficiencies of photocatalytic hydrogen production, the definition of efficiency used in this description is different from that reported by other groups. The photon conversion efficiency (P.E.) of the photocatalyst toward $H_2$ production is defined as: P.E.=$N_H/N_P$. Where, $N_H$ and $N_P$ refer to the number of photons utilized in generating hydrogen and total number of incident photons arriving on the photocatalyst surface, respectively. The absorption band of CdS extends from 300 nm to 520 nm. Therefore, $N_p$ shown above is determined by integrating the photon flux within the wavelength band 300-520 nm.

The efficiency calculation for the present invention is closer to the solar radiation spectrum. The method of efficiency calculation based on integration over a wide range of wavelengths is an innovation that has not been previously employed and is the primary reason for the lower reported efficiencies of the present catalysts. To make a comparison, the quantum efficiency of hydrogen evolution at the 420 nm light over the present catalysts Pd—$Cr_2O_3$/CdS was calculated to be approximately 55.6% on the assumption that the light was irradiated at 420 nm. In contrast, the quantum efficiency from 300 to 520 nm is calculated to be about 20%. However, it should be pointed out that the efficiency calculation for the present invention is based on the practical application and is a real datum that can be used for solar energy conversion calculation directly.

FIG. 2 is a graph showing the effect of chromium oxide loading percentage on the activity of Pd—$Cr_2O_3$/CdS photocatalyst performance with 300 ml of 1.0 M $(NH_4)_2SO_3$. It is noted that the photon efficiency (P.E.) of the photoreaction using 0.4 wt % Pd loaded on 0.5 g of CdS was approximately 13.4% of the light energy received in the wavelength band of 300 to 520 nm. But, as shown in FIG. 2, adding 0.05 wt % of chromium oxide (calculated based on 0.5 g of CdS) to Pd/CdS, the P.E. of the Pd—$Cr_2O_3$/CdS photocatalytic production of $H_2$ increases from approximately 13.4% to approximately 18.3%. The optimum chromium oxide loading appears to be approximately 0.1 wt % yielding a P.E. of approximately 20.0%. By increasing the chromium oxide loading to approximately 0.3 wt %, the P.E. of the photocatalyst drops somewhat to approximately 17.9%.

Figure 3:
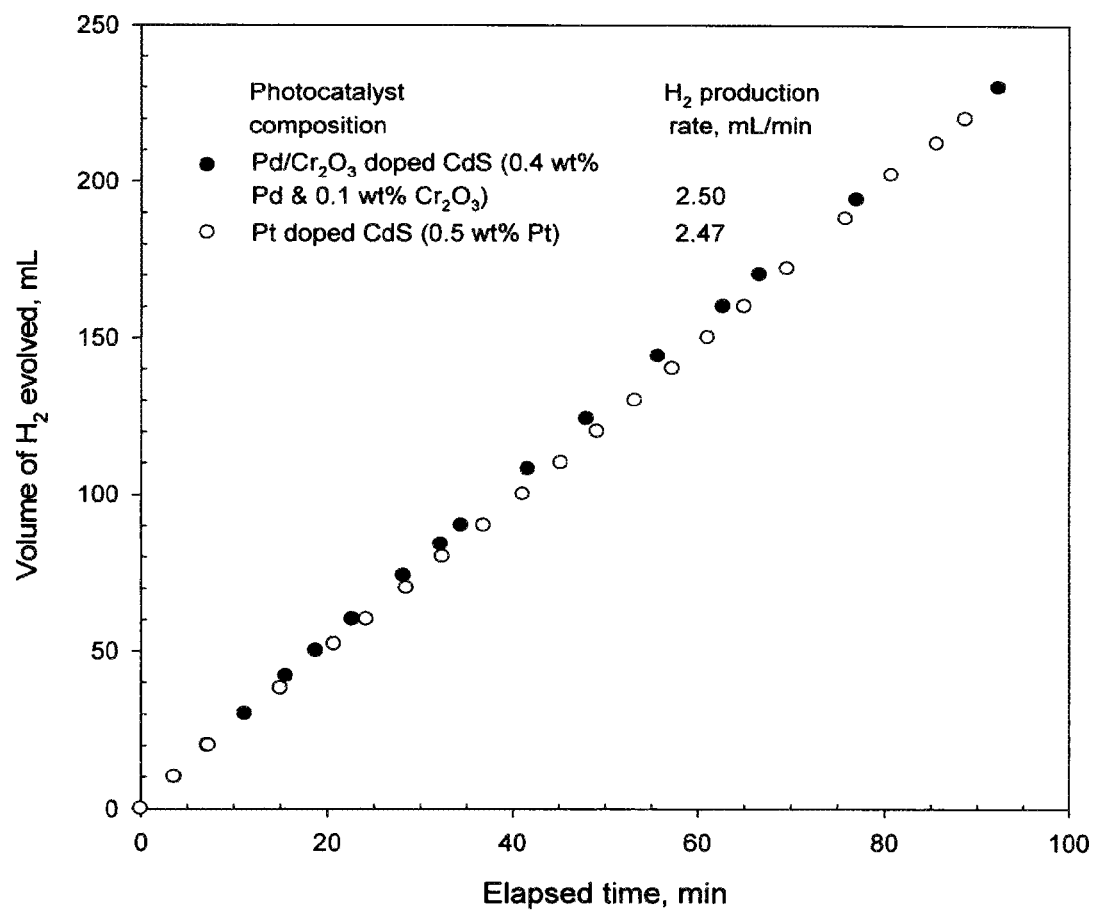
FIG. 3 is a graph showing the $H_2$ evolution vs. time for two different CdS based photocatalysts doped with Pt and Pd/$Cr_2O_3$, Pd/$Cr_2O_3$ doped CdS (0.4 wt % Pd and 0.1 wt % $Cr_2O_3$) and Pt doped CdS (0.5 wt % Pt).
Figure 4:
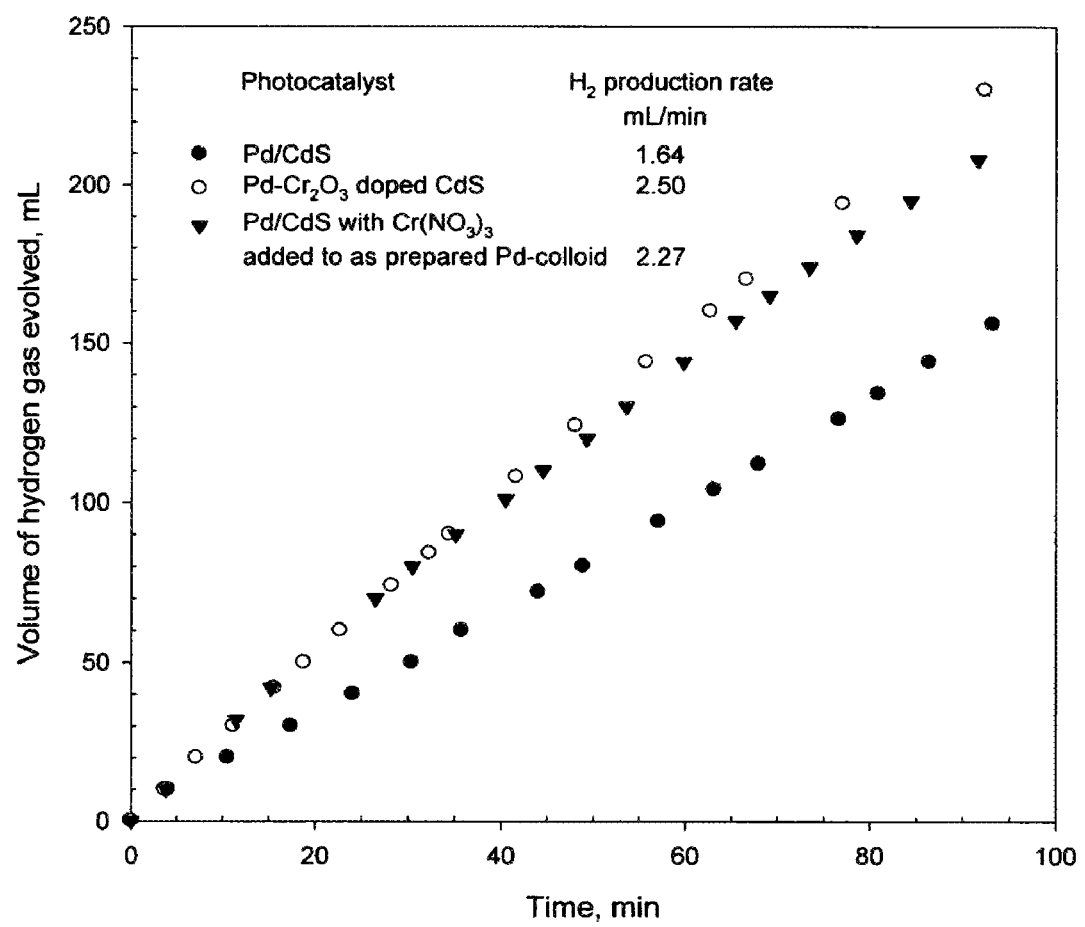
FIG. 4 is a graph showing the photocatalytic evolution of hydrogen from aqueous solution of 1.0 M $(NH_4)_2SO_3$.

FIG. 3 is a graph showing $H_2$ evolution vs. time for two CdS based photocatalysts loaded with Pt and Pd/$Cr_2O_3$, (CdS weight: 0.5 g, photolyte: 1.0 M $(NH_4)_2SO_3$). FIG. 4 shows that Pd/CdS with $Cr(NO_3)_3$ added shows much higher activity than that of Pd/CdS, although the activity is slightly lower than that of the Pd—$Cr_2O_3$/CdS prepared from $H_2PdCl_4$—$Cr(NO_3)_3$-PVP solution.

Figure 5A:
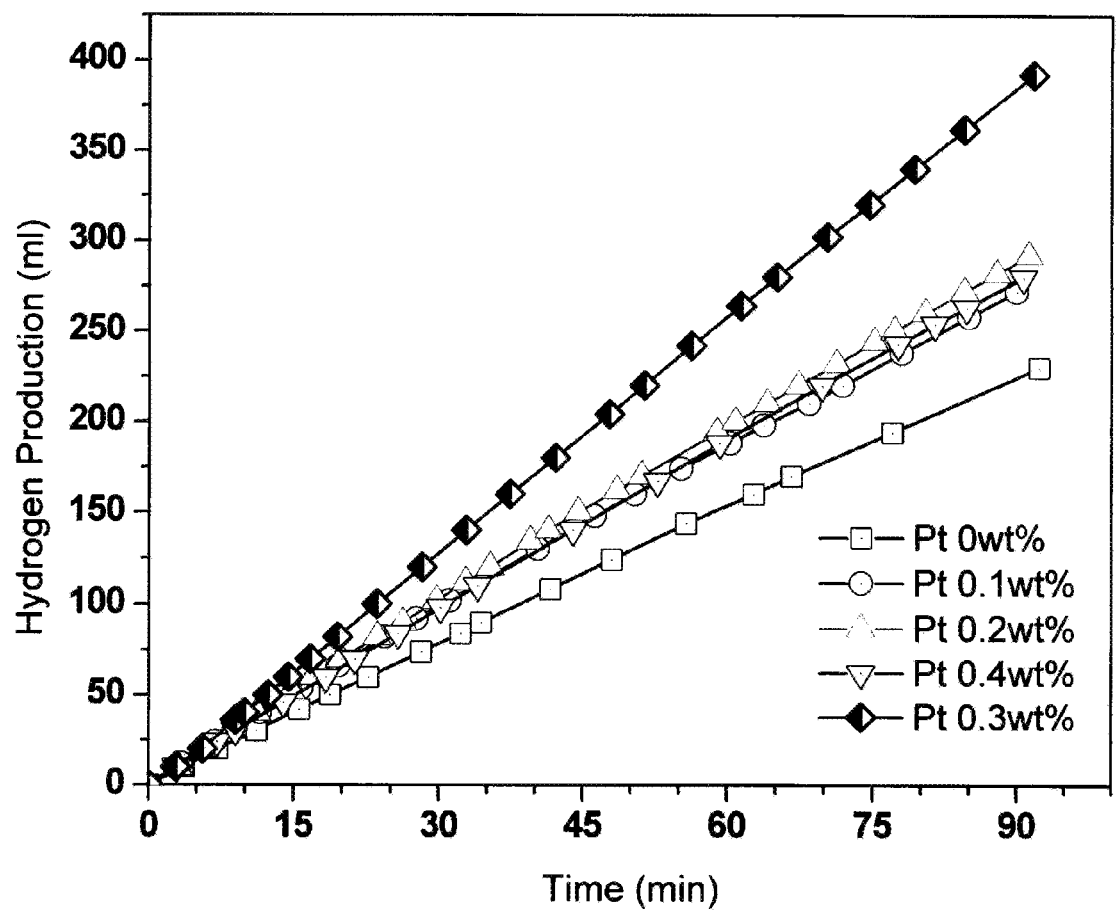
FIG. 5a is a graph showing the effect of platinum loading on the photocatalytic activity of Pd—$Cr_2O_3$/CdS photocatalysts for $H_2$ evolution from aqueous ammonia sulfite solution.
Figure 5B:
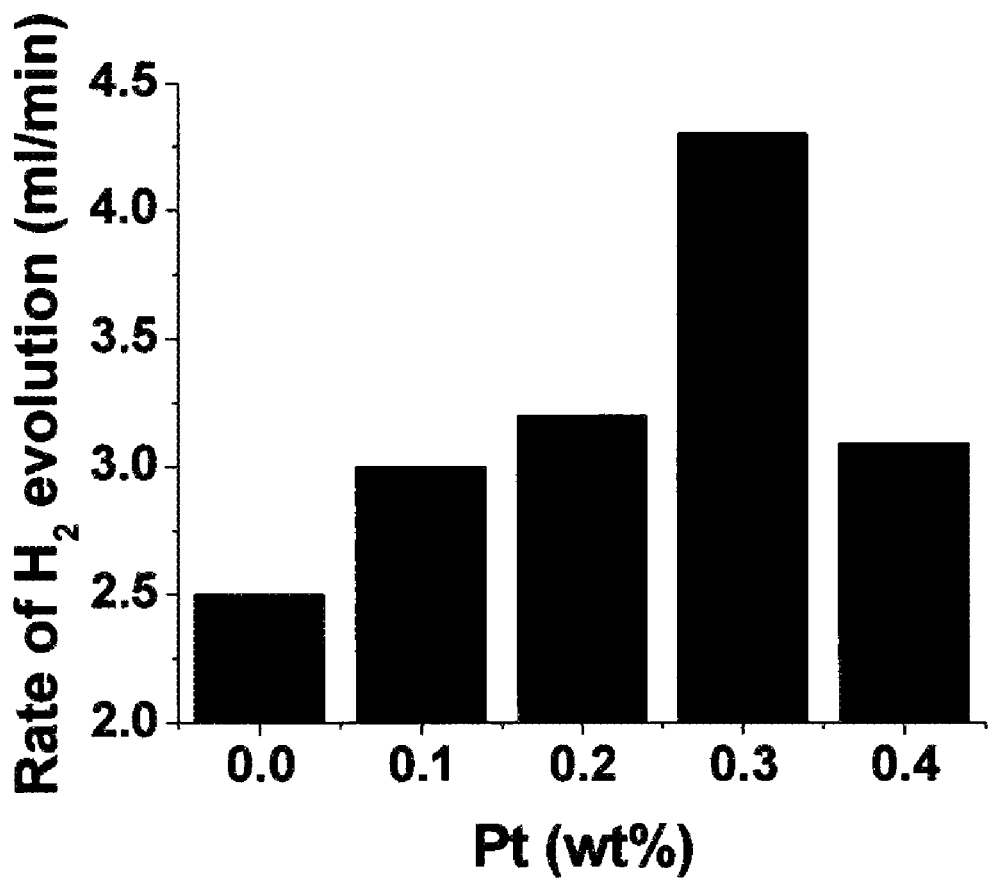
FIG. 5b is a histogram showing the rate of $H_2$ evolution as a function of Pt loading percentage.

FIGS. 5a and 5b show the effect of platinum loading on the photocatalytic activity of Pd—$Cr_2O_3$/CdS photocatalysts for $H_2$ evolution from aqueous ammonia sulfite solution for 0.5 g CdS loaded with 0.4 wt % Pd and 0.1 wt % $Cr_2O_3$. New efficient composite cocatalysts involving a pair of noble metals combined with $Cr_2O_3$ could also be prepared by using the present method. It is noted that, as shown in FIGS. 5a and 5b, the activity of Pd—$Cr_2O_3$/CdS increases by the addition of Pt to form a Pt—Pd—$Cr_2O_3$/CdS composite photocatalyst.

Figure 6:
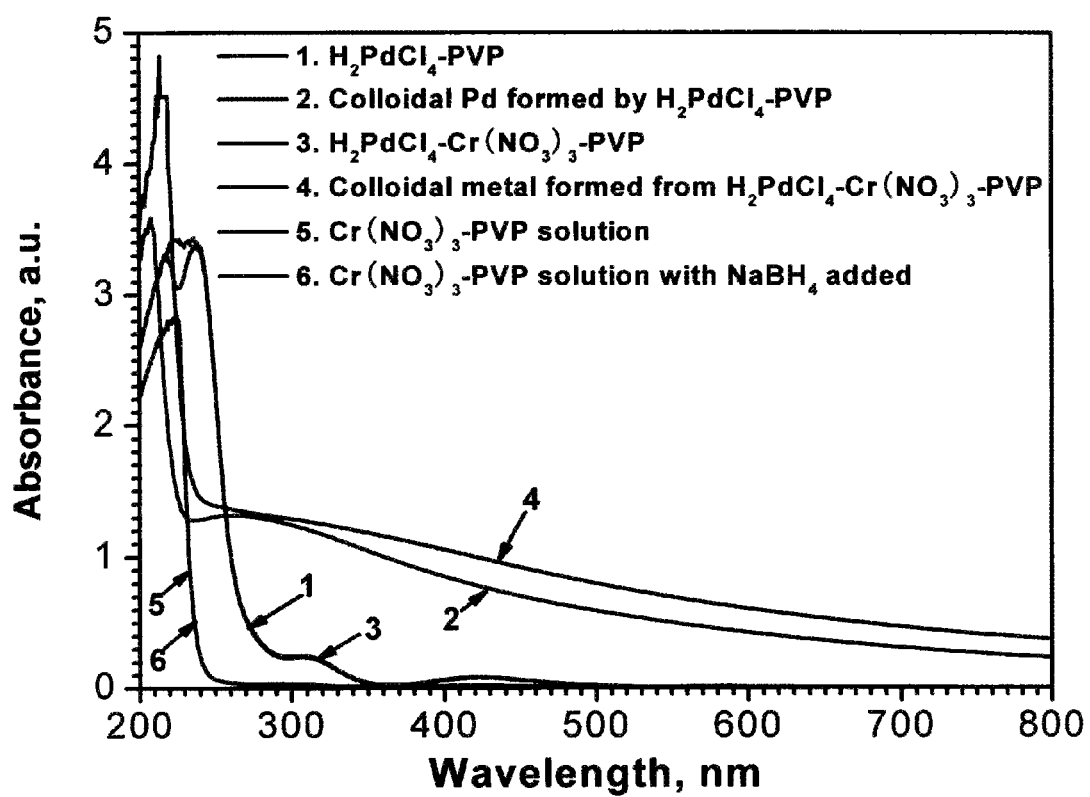
FIG. 6 is a graph showing light absorbance spectra of Pd—$Cr_2O_3$ nanoparticle colloidal solutions.

As-prepared colloidal Pd metal particles possess a dark-brown color that is readily distinguishable from the light yellow color of its precursor: aqueous $H_2PdCl_4$ solution. The colloidal Pd particles were stable for several months without any observable metal precipitate. FIG. 6 shows the absorption spectra of aqueous $H_2PdCl_4$ and Pd colloidal solutions. The aqueous $H_2PdCl_4$ solution in the presence of PVP shows an absorption peak with maximum at 235 nm, which is attributed to ligand-to-metal charge transfer in $[PdCl_4]^{2-}$ ions. The increase in absorbance value in the range of wavelengths from 250 to 800 nm in the absorption spectra implies the formation of colloidal Pd particles (colloid A) produced by reduction of $H_2PdCl_4$+PVP solution with $NaBH_4$. As for the $Cr(NO_3)_3$+PVP solution, the strong UV absorption bands related to $Cr^{3+}$ do not change after $NaBH_4$ addition, indicating that $NaBH_4$ is unable, under the experimental conditions, to reduce $Cr^{3+}$ ions to metallic chromium or to $Cr^+$ ions. For the $H_2PdCl_4$—$Cr(NO_3)_3$—PVP solution, a continuous and broad absorption band appears after the solution is reduced by $NaBH_4$ to form a metal colloid solution (colloid B).

FIG. 6 also indicates that the spectrum of colloid B is slightly shifted to longer wavelengths in comparison with that of colloid A. Accordingly, colloid B color is much darker than that of colloid A. The broad absorption spectrum of a metal colloid typically originates from the inter-band transitions of the metal nanoparticles, which is a characteristic light absorption property of a metal colloid. Both the red shift and the deeper color of the colloidal solution B point to the effect of $Cr^{3+}$ cations on the formation and optical properties of the Pd colloid.

Figure 7A:
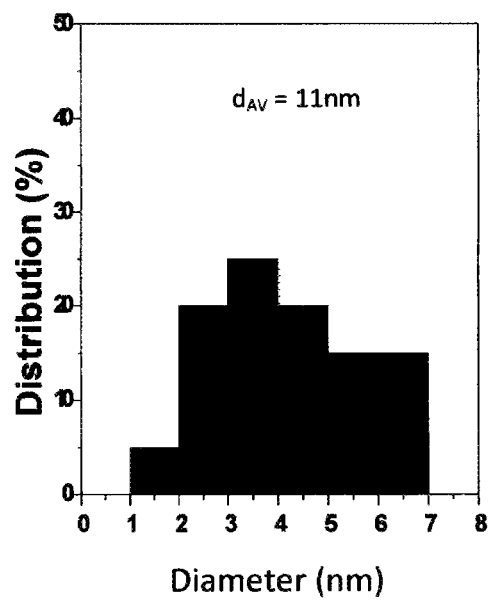
FIG. 7a is a histogram showing the particle size distribution of colloidal Pd formed from $H_2PdCl_4$-PVP.
Figure 7B:
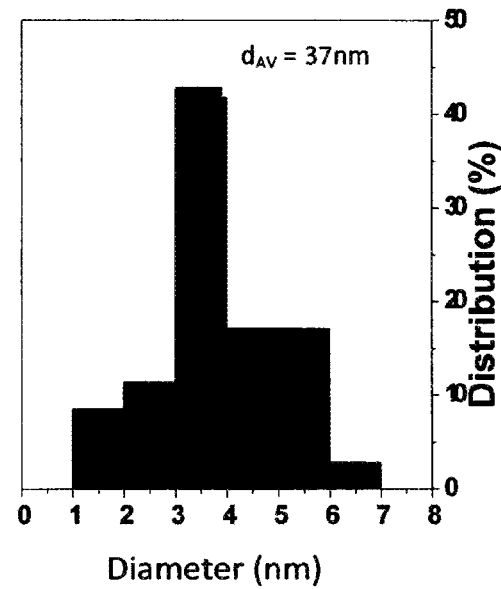
FIG. 7b is a histogram showing the particle size distribution of colloidal Pd formed from $H_2PdCl_4$—$Cr(NO_3)_3$—PVP solutions.

FIGS. 7a and 7b show the particle size distribution histograms of the as prepared PVP-stabilized colloidal Pd (colloid A and colloid B). As shown, FIG. 7a is a histogram showing the particle size distribution of colloidal Pd formed from $H_2PdCl_4$-PVP solution and FIG. 7b is a histogram showing the particle size distribution of colloidal Pd formed from $H_2PdCl_4$—$Cr(NO_3)_3$—PVP solution. All spherical Pd metal nanoparticles were produced with narrow size distributions and high dispersion. Approximately 42% of colloid B particles were in the size range of approximately 3 to approximately 4 nm compared with only 25% for colloid A. The average particle size of the PVP-stabilized Pd nano-particles was approximately 4.1 nm and approximately 3.7 nm for the colloidal particles obtained from $H_2PdCl_4$-PVP solution and $H_2PdCl_4$—$Cr(NO_3)_3$—PVP solution, respectively. The differences in the average particle size and distribution for these two solutions implies that colloidal Pd formation is affected by the addition of $Cr(NO_3)_3$, which is in agreement with the UV-visible spectrometric measurements. The reduction in the size of Pd particles appears to be one of the reasons for the improved activity of Pd—$Cr_2O_3$/CdS photocatalyst that is affected by the size of the deposited cocatalyst particles. High Resolution TEM (HRTEM) images showed that Pd colloids exhibit clear crystal features involving single crystal, simple twin and multiple-twin icosahedron or decahedron structures.

In the series of experiments previously described, the co-catalyst preparation procedure was modified such that $Cr(NO_3)_3$ was not preliminarily converted to chromium oxide, i.e., $Cr(NO_3)_3$ solution was directly added to the colloidal Pd solution followed by addition of CdS powder to the resulting mixture. Finally, the prepared solution was mixed with aqueous $(NH_4)_2SO_3$ solution and used as the photolyte in the photocatalytic $H_2$ production experiment. Thus, unlike previous Pd—$Cr_2O_3$ cocatalyst preparation for experiments, preparation leading to the present invention the $Cr(NO_3)_3$ was mixed with colloidal Pd solution without PVP addition and without co-reduction by $NaBH_4$. The addition of $Cr(NO_3)_3$ is unlikely to affect the particle size distribution and/or light absorbance characteristics of already formed colloidal Pd solution. But this method of photocatalyst preparation yielded a photocatalyst that showed relatively high activity generating 2.27 ml/min of hydrogen from $(NH_3)_2SO_3$—more than 1.64 ml/min $H_2$ obtained from the plain Pd/CdS (catalyst prepared from colloid A) and slightly lower than 2.5 ml/min $H_2$ obtained from the Pd—$Cr_2O_3$/CdS (catalyst prepared using colloidal solution B). FIG. 4 shows that Pd/CdS with $Cr(NO_3)_3$ added shows much higher activity than that of Pd/CdS, although the activity is slightly lower than that of the Pd—$Cr_2O_3$/CdS prepared from $H_2PdCl_4$—$Cr(NO_3)_3$—PVP solution. The following data on Cr(III) ion—water equilibria may shed light on the nature of this experimental result:

$$Cr^{3+}+H_2O \rightarrow Cr(OH)^{2+}+ \text{ at pH=4.0}$$

$$Cr(OH)^{2+}+H_2O \rightarrow Cr(OH)_2^+ +H^+ \text{ at pH=5.7}$$

$$Cr(OH)_2^+ +H_2O \rightarrow Cr(OH)_3\downarrow +H^+ \text{ at pH=5.7}$$

$Cr(NO_3)_3$ exists as $Cr^{3+}$ cations in the colloidal Pd solution at pH values lower than 2. Increasing the pH of the solution by adding aqueous $(NH_4)_2SO_3$ results in $Cr^{3+}$ hydrolysis forming initially $[Cr(OH)]^{2+}$, and then $Cr(OH)_3$ (or $Cr_2O_3 \cdot 3H_2O$) precipitate at pH=8.3. The pH of 1.0 M $(NH_4)_2SO_3$ aqueous solution is in the range of 7.9 to 8.3 at room temperature and, at this pH range, $Cr(NO_3)_3$ will precipitate completely as $Cr(OH)_3$ onto and coat the Pd and CdS particles.

It was shown that almost 100% of the metal hydroxides can be deposited onto the surfaces of zeolites and their internal surfaces within the pore walls. Due to the residual positive charge of the $Cr(OH)_3$ particles they could potentially impart a charge to Pd nanoparticles as they form, thus preventing them from further aggregation to larger particles. This may explain why the deposition of $Cr_2O_3 \cdot 3H_2O$ onto Pd yields Pd—$Cr_2O_3$/CdS photocatalyst having enhanced hydrogen evolution activity. The lower activity of the photocatalyst prepared directly from $Cr(NO_3)_3$ compared to that of Pd—$Cr_2O_3$/CdS formed by pre-hydrolysis of $Cr(NO_3)_3$ implies that the photocatalyst activity is affected by the method employed in its preparation. Indeed, in the former case, $Cr_2O_3$ is deposited on the surface of Pd particles after they are already formed (i.e., the presence of $Cr_2O_3$ has no effect on the size of Pd particles). This experimental fact supports the co-inventors hypothesis that simultaneous formation of Pd and $Cr_2O_3$ nanocomposite particles during the reduction of Pd precursor and hydrolysis of $Cr_2O_3$ precursor by $NaBH_4$ yields much smaller particles than those prepared by consecutive synthesis of Pd and $Cr_2O_3$ particles.

New noble metal-$Cr_2O_3$ nano-composite cocatalysts can also be prepared using the above-described method. During experiments, the co-inventors prepared Pt—, Pd—, Ru—, Rh—, Ag— and Au—$Cr_2O_3$ single and bi-metal nanocomposite cocatalysts that showed excellent $H_2$ production activities. FIG. 5a is a graph showing the effect of platinum loading on the photocatalytic activity of Pd—$Cr_2O_3$/CdS photocatalysts for $H_2$ evolution from aqueous ammonia sulfite solution and FIG. 5b is a histogram showing the rate of $H_2$ evolution as a function of Pt loading percentage. As shown in FIGS. 5a and 5b, addition of Pt further promotes the activity of Pd—$Cr_2O_3$/CdS for hydrogen evolution. Moreover, these cocatalysts and the methods for their synthesis can be combined with other bandgap photocatalysts, such as $TiO_2$ or solid solution based metal sulfide photocatalysts, for $H_2$ production or environmental remediation applications.

In summary, the present invention provides a facile method for preparation of novel efficient photocatalysts based on CdS supported Pd—$Cr_2O_3$ and Pd—$Cr_2O_3$—Pt nanocomposite cocatalysts for solar hydrogen production using $(NH_4)_2SO_3$ as a regenerable electron donor. The Pd—$Cr_2O_3$ loaded CdS photocatalyst shows a much higher hydrogen evolution rate than that of a plain Pd metal loaded CdS, having a photocatalytic activity that is comparable to that of the Pt/CdS photocatalyst. The observed enhancement in the photocatalytic activity of Pd—$Cr_2O_3$/CdS toward hydrogen evolution from ammonium sulfite is attributed to the formation of a catalytically active and relatively stable Pd—$Cr_2O_3$ nanocomposite cocatalyst on the surface of CdS particles with reduced particle size compared to plain Pd cocatalyst. In the experiments leading to the present invention, the feasibility of $(NH_4)_2SO_3$ regeneration from $(NH_4)_2SO_4$ by means of a series of thermochemical reactions is shown, which collectively allow water splitting via a closed loop, hybrid solar photo-thermochemical cycle.

As to the efficiencies of photocatalytic hydrogen production, the apparent differences between the experimental results in the present patent application and other literature results from three major factors: basic definitions, photoreaction systems and photoreactor configurations.

Figure 8:
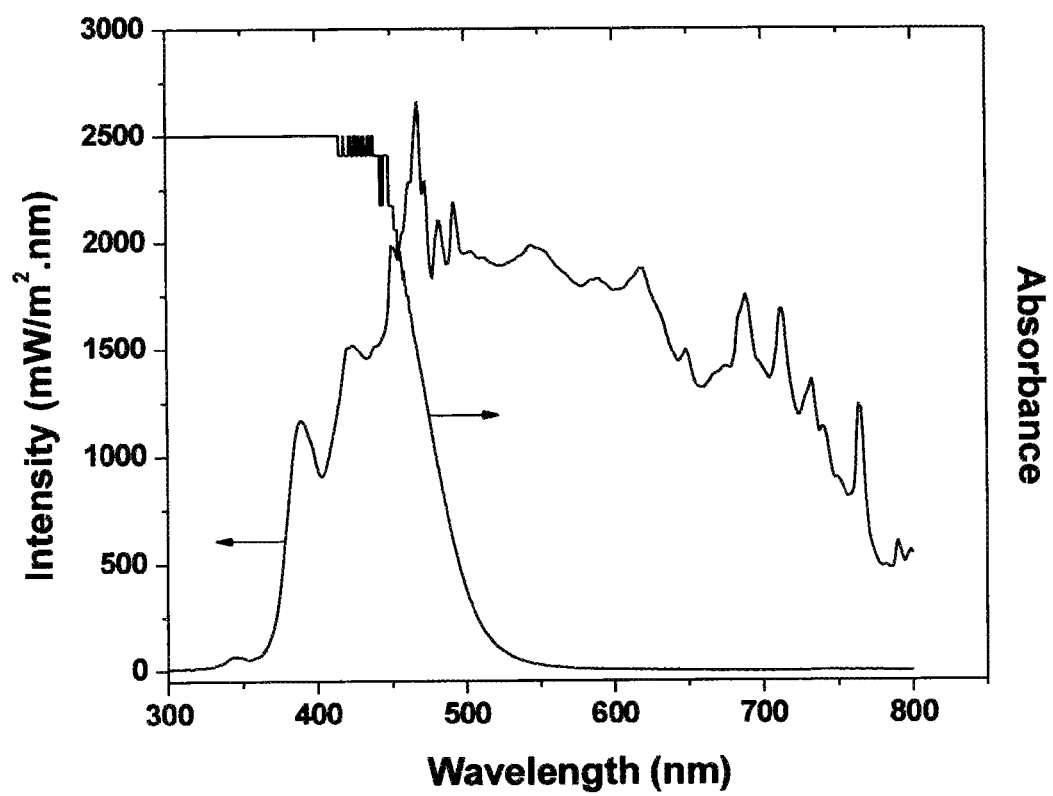
FIG. 8 is a graph showing the absorption spectrum of CdS and the irradiation spectrum of a Xe lamp in 300-800 nm.

Firstly, the quantum efficiency defined by other groups is calculated based on a single light irradiation at 420 nm. Referring to FIG. 8, the efficiency defined in this application is calculated using the spectrum ranging from 300 to 520 nm, which covers the entire absorption of the CdS main photocatalyst. The total number of photons ($N_p$) from 300 to 520 nm are calculated based on the following function:

$$N_p = \frac{I \times t \times s}{Lhc/\lambda}$$

$$\Rightarrow dN_p\Big|_\lambda \frac{I_\lambda d\lambda \cdot t \times s}{Lhc/\lambda} = I_\lambda \lambda d\lambda \cdot \frac{t \times s}{Lhc}$$

$$\Rightarrow N_p = \int_{300}^{520} dN_p = \int_{300}^{520} I_\lambda \lambda d\lambda \cdot \frac{t \times s}{Lhc}$$

-continued
$$\Rightarrow N_p = \frac{t \times s}{Lhc} \times \int_{300}^{520} I_\lambda \lambda d\lambda$$

Where t, s, L, h, c, $I_\lambda$ and $\lambda$ are radiation time (second), irradiated light area (photoreactor window area in $cm^2$), Avogadro's number, Plank's constant, light speed, light intensity ($\mu W \cdot cm^{-2} \cdot nm^{-1}$) at special wavelength, and wavelength, respectively.

As shown in the formula above, the efficiency calculation is based on the solar radiation spectrum and is more realistic in terms of solar energy utilization than the prior art methods. As reported, the quantum efficiency of a photocatalytic reaction as a function of radiation wavelength is similar to that of the UV-vis absorption spectrum of the photocatalyst, meaning that the longer wavelength radiation results in lower efficiency. The efficiency calculation includes longer wavelength radiation, therefore, photocatalyst efficiencies calculated using our method are expected to be lower than those calculated using only 420 nm wavelength. For example, photocatalyst efficiency calculated based on wavelength ranging from 420 nm to 520 nm show much lower efficiencies for hydrogen production over CdS. However, it also include wavelengths from 300 nm to 420 nm photons (0.0019 mol photons irradiated in one hour), but compared to the number of photons from 420 nm to 520 nm (0.0087 mmol/hour), the shorter wavelength photons are about 21.8%.

In order to have a better understanding of the efficiency calculations based on the two definitions, the total number of photons is calculated based on a given photonic energy and then calculate efficiencies based on 420 nm and on 300 to 520 nm. It was hound that the quantum efficiency of hydrogen evolution based on 420 nm radiation over the present catalysts Pd—$Cr_2O_3$/CdS is 55.6%. In contrast, the efficiency based on 300 to 520 nm is only about 20%, over 2.5 times lower than that using the method of the present invention. The efficiencies described are based on the solar spectrum and can be directly used for solar energy conversion calculations.

The efficiency of a photocatalyst is associated with a photoreaction system. For example, hydrogen production via photo-oxidation of an aqueous sulfide ($S^{2-}$) is far more efficient than that of a sulfite solution based photo-oxidation over CdS based photocatalysts. On the other hand, although the highest reported quantum efficiency for hydrogen evolution from a sulfide solution reached 90% twenty years ago, the highest quantum efficiency for hydrogen evolution from an aqueous sulfite solution is only 35% at 436 nm. As mentioned previously, the method of the present invention achieves 55.6% of quantum efficiency, based on radiation at 420 nm, for hydrogen evolution over Pd—$Cr_2O_3$/CdS photocatalysts via photooxidation of aqueous ammonium sulfite solutions. This is the highest reported quantum efficiency resulting from an aqueous sulfite solution.

The other important issue related to the efficiency calculation is that the co-inventors used absorbed photons ($N_{AP}$) for efficiency calculation. In this case, photonic energy losses ($N_{LP}$), such as light scattering, reflection and light absorption by the reactor walls, were neglected. This is a theoretical ideal condition. The co-inventors used photonic energy passing through a photoreactor window as total photonic energy received for the calculation. This total energy ($N_{TP}$) takes into account all the light energy losses, and the efficiency calculated based on this method must definitely be lower than the ideal condition. The method is more realistic and can be used for process designs and cost estimations for solar water splitting.

The present invention provides a novel Pd—$Cr_2O_3$ cocatalyst with high efficiency, comparable to a Pt based cocatalyst, and a novel technique for the preparation of a nanosized non-platinum based composite using a simple, fast, and effective method. It has been shown that the novel method of the present invention can also be used to prepare other noble metal based catalysts. It has to be pointed out that although $NaBH_4$ reduction technology for preparation of Pt and Pd nanoparticles has previously been reported, the methods of the present invention is the first to modify the previously known method and apply the method of the present invention to the preparation of Pt and Pd based metals and alloys as cocatalysts for water splitting.

Prior art polymer stabilized technology can be used to synthesize nanosized metal particles. However, when the particles are small and stabilized in colloidal form, they are very difficult to deposit onto a main photocatalyst in the formation of an effective photocatalyst. The present invention provides a method wherein the solution's pH has a significant effect on the stability of the nanosized metal or alloy particles. The experimental results have shown that metal particles and $Cr_2O_3$ can be loaded to CdS powder photocatalyst by increasing the pH of the reduced colloidal solution from approximately 2.0 to approximately 8.5. The UV-vis spectral analyses indicated that the particle loading efficiency (from colloidal particles to particles absorbed onto CdS surface) could reach up to 100%. Thus, the present invention provides a method that overcomes the polymer stabilization effect. Furthermore, the technology of the present invention (the modified $NaBH_4$ reduction method) does not require a catalyst pre-treatment process as do conventional thermal deposition methods.

Figure 9:
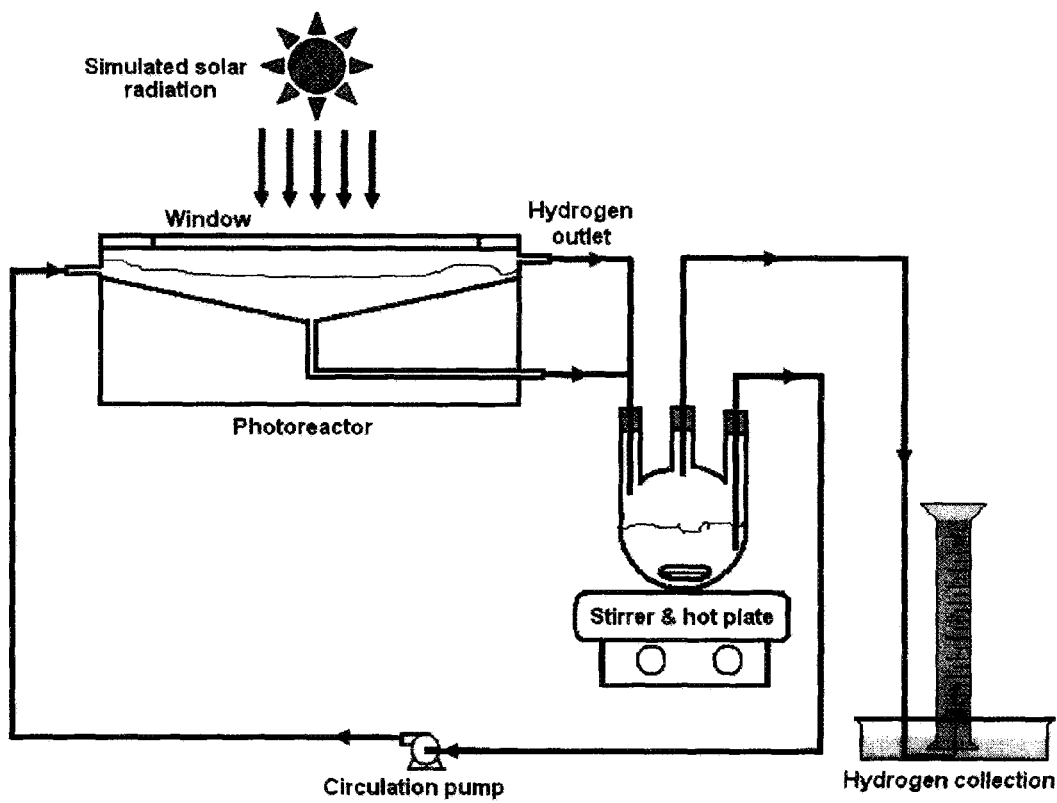
FIG. 9 is a schematic flow diagram showing an example of a photoreactor with passive mixing.

The efficiency of a photocatalyst also depends on the photoreactor used. In the experiments, a passive stirring reactor with a photolyte as shallow as 10 mm was used. No internal stirring mechanism was applied. The advantages of this design are (1) only a small amount of photolyte is needed, thus saving the cost of the chemicals and (2) it is applicable for design of a practical system because mixing photocatalyst particles with an electrolyte in a large photochemical reaction is an engineering issue. The present invention successfully resolves this issue by introducing a passive mixing photoreactor design as shown in FIG. 9.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method comprising the steps of:
mixing $H_2PdCl_4$ and $Cr(NO_3)_3$ as a precursor solution;
reducing the palladium chloride with aqueous $NaBH_4$ to form Pd colloidal solution;
adding cadmium sulfide (CdS) powder to the Pd colloidal solution with vigorous stirring to disperse the powder; and
adding $(NH_4)_2SO_3$ solution to as prepared solution to form Pd—$Cr_2O_3 \cdot nH_2O$ particles that are loaded on CdS surface forming (Pd—$Cr_2O_3$)/CdS photocatalyst.

2. The method of claim 1 further comprising the step of:
adding and mixing polyvinylpyrolidone (PVP) to the $H_2PdCl_4$ and $Cr(NO_3)_3$ solution prior to the reducing step to prevent the agglomeration of Pd nanoparticles formed during the reduction step.

3. The method of claim 2 wherein the adding $(NH_4)_2SO_3$ solution step includes the step of:
co-loading Pd and $Cr_2O_3$ onto the surface of CdS photocatalyst to increase the $H_2$ evolution rate.

4. The method of claim 1 further comprising the step of:
adding Pt to the (Pd—$Cr_2O_3$)/CdS photocatalyst to form a (Pt—Pd—$Cr_2O_3$)/CdS composite photocatalyst.

5. The method of claim 1 further comprising the step of:
adding at least one noble metal selected from a group consisting of Ru, Rh, Os, Au and Ag to the Pd—$Cr_2O_3$ cocatalyst to form (metal-Pd—$Cr_2O_3$) nanocomposite cocatalysts to improve the solar hydrogen evolution rates.

6. A method for production of Pd colloidal solution comprising the steps of:
mixing $H_2PdCl_4$ and $Cr(NO_3)_3$ solution as a precursor;
adding PVP to the precursor solution;
mixing thoroughly; and
reducing the precursor solution with aqueous $NaBH_4$ solution to form a Pd colloidal solution.

7. The method of claim 6 further comprising the step of:
adding cadmium sulfide (CdS) powder to the resulting solution and stirring to disperse CdS powder.

8. The method of claim 7 wherein the reducing step comprises the step of:
adding 1.0 M $(NH_4)_2SO_3$ solution to as prepared solution to form Pd—$Cr_2O_3 \cdot nH_2O$ particles that are loaded on CdS surface forming (Pd—$Cr_2O_3$)/CdS photocatalyst.

9. A method to prepare photococatalyst to produce hydrogen using aqueous ammonium sulfite solutions as electron donors comprising the step of:
providing solutions of $H_2PdCl_4$ and $Cr(NO_3)_3$;
adding PVP to the mixture of $H_2PdCl_4$ and $Cr(NO_3)_3$ to prevent aggregation of Pd nanoparticles;
reducing the solution of $H_2PdCl_4$ and $Cr(NO_3)_3$ with $NaBH_4$ solution to produce nanosized Pd colloidal solution;
adding CdS powder to the Pd colloidal solution while stirring vigorously; and
adding the resulting solution to an aqueous $(NH_4)_2SO_3$ solution to produce (Pd—$Cr_2O_3$)/CdS photocatalyst for hydrogen production from the aqueous $(NH_4)_2SO_3$ solution.

10. A method for preparing a (Pd—$Cr_2O_3$)/CdS photocatalyst for hydrogen production comprising the steps of:
providing an aqueous palladium chloride ($PdCl_2$) solution as a precursor;
adding PVP to the precursor solution;
reducing the precursor solution with the presence of PVP with sodium borohydride ($NaBH_4$) for the preparation of nanosized palladium metal colloid;
adding aqueous $Cr(NO_3)_3$ solution into the Pd colloid;
adding CdS semiconductor powder to the mixture of Pd colloid and $Cr(NO_3)_3$ solution; and
adding aqueous $(NH_4)_2SO_3$ solution to as prepared solution to form (Pd—$Cr_2O_3 \cdot nH_2O$) particles that are immobilized Pd—$Cr_2O_3$ particles on CdS surface forming the (Pd—$Cr_2O_3$)/CdS photocatalyst.

11. A nano composite cocatalyst for solar hydrogen production comprising:
Pd—$Cr_2O_3$ loaded CdS co-catalyst.

12. The nano composite cocatalyst of claim 11 further comprising:
at least one noble metal selected from a group consisting of Pt, Ru, Rh, Os, Au and Ag added to the Pd—$Cr_2O_3$ cocatalyst.

* * * * *